US008813109B2

(12) United States Patent
Ramaswamy

(10) Patent No.: US 8,813,109 B2
(45) Date of Patent: Aug. 19, 2014

(54) METHODS AND APPARATUS TO IDENTIFY EXPOSURE TO 3D MEDIA PRESENTATIONS

(75) Inventor: Arun Ramaswamy, Tampa, FL (US)

(73) Assignee: The Nielsen Company (US), LLC, Schaumburg, IL (US)

(*) Notice: Subject to any disclaimer, the term of this patent is extended or adjusted under 35 U.S.C. 154(b) by 79 days.

(21) Appl. No.: 13/401,489

(22) Filed: Feb. 21, 2012

(65) Prior Publication Data
US 2013/0100259 A1  Apr. 25, 2013

Related U.S. Application Data

(60) Provisional application No. 61/550,138, filed on Oct. 21, 2011.

(51) Int. Cl.
H04H 60/56 (2008.01)
H04N 21/442 (2011.01)
H04N 21/214 (2011.01)

(52) U.S. Cl.
CPC ...... *H04N 21/44231* (2013.01); *H04N 21/2146* (2013.01); *H04N 21/44204* (2013.01); *H04N 21/44218* (2013.01); *H04N 21/44222* (2013.01)
USPC .................................. 725/12; 725/9; 725/17

(58) Field of Classification Search
CPC .................... H04N 21/4126; H04N 21/44204; H04N 21/44218; H04N 21/44222; H04N 21/44231
USPC .................................. 725/18, 12; 348/56–58
See application file for complete search history.

(56) References Cited

U.S. PATENT DOCUMENTS

| 4,695,879 | A | | 9/1987 | Weinblatt |
|---|---|---|---|---|
| 5,574,962 | A | * | 11/1996 | Fardeau et al. ............. 455/2.01 |
| 5,648,757 | A | * | 7/1997 | Vernace et al. ........... 340/539.32 |
| 6,346,891 | B1 | * | 2/2002 | Feinleib et al. ............ 340/12.3 |
| 7,926,949 | B1 | * | 4/2011 | Boothroyd ....................... 353/8 |
| 8,207,843 | B2 | * | 6/2012 | Huston .................... 340/539.13 |
| 8,264,618 | B2 | * | 9/2012 | Kabasawa et al. ........... 348/734 |
| 8,370,873 | B2 | | 2/2013 | Shintani |
| 2002/0010919 | A1 | | 1/2002 | Lu et al. |
| 2002/0084929 | A1 | * | 7/2002 | Stefanik ........................ 341/176 |
| 2003/0046685 | A1 | * | 3/2003 | Srinivasan et al. ............. 725/18 |
| 2006/0248553 | A1 | | 11/2006 | Mikkelson et al. |
| 2007/0046776 | A1 | | 3/2007 | Yamaguchi et al. |
| 2009/0315977 | A1 | | 12/2009 | Jung et al. |
| 2009/0322857 | A1 | | 12/2009 | Jacobs et al. |
| 2010/0016011 | A1 | | 1/2010 | Alen |
| 2010/0149636 | A1 | * | 6/2010 | MacNaughton et al. ..... 359/477 |

(Continued)

OTHER PUBLICATIONS

Ramaswamy, Arun, "3D Television Monitoring Glasses", Published on Feb. 21, 2011 (2 pages).

(Continued)

*Primary Examiner* — Pankaj Kumar
*Assistant Examiner* — Timothy Newlin
(74) *Attorney, Agent, or Firm* — Hanley, Flight & Zimmerman, LLC

(57) ABSTRACT

Methods and apparatus are disclosed to identify exposure to 3D media presentation. An example apparatus includes 3D glasses components to enable presentation of a 3D media presentation. The example apparatus includes 3D glasses to enable viewing of a 3D media presentation. The example apparatus includes a motion sensor carried by the 3D glasses to generate a movement signal. The example apparatus includes a transmitter carried by the 3D glasses to transmit the movement signal.

25 Claims, 11 Drawing Sheets

(56) References Cited

U.S. PATENT DOCUMENTS

| | | | |
|---|---|---|---|
| 2010/0157028 A1* | 6/2010 | MacNaughton et al. ....... | 348/53 |
| 2010/0157031 A1 | 6/2010 | MacNaughton et al. | |
| 2010/0262986 A1 | 10/2010 | Adimatyam et al. | |
| 2011/0050870 A1* | 3/2011 | Hanari .......................... | 348/56 |
| 2011/0122238 A1 | 5/2011 | Hulvey et al. | |
| 2011/0156998 A1* | 6/2011 | Huang et al. ................. | 345/156 |
| 2011/0188582 A1 | 8/2011 | Price | |
| 2011/0225611 A1* | 9/2011 | Shintani ........................ | 725/39 |
| 2011/0249103 A1* | 10/2011 | Taniguchi ...................... | 348/56 |
| 2011/0254936 A1 | 10/2011 | MacNaughton et al. | |
| 2012/0007947 A1 | 1/2012 | Costa et al. | |
| 2012/0013604 A1* | 1/2012 | Kang ............................. | 345/419 |
| 2012/0026286 A1 | 2/2012 | Wang | |
| 2012/0038756 A1 | 2/2012 | Jo | |
| 2012/0050498 A1 | 3/2012 | Jung et al. | |
| 2012/0050506 A1 | 3/2012 | Shintani | |
| 2012/0062562 A1* | 3/2012 | Chen et al. ................... | 345/419 |
| 2012/0081363 A1* | 4/2012 | Kang et al. ................... | 345/419 |
| 2012/0098931 A1* | 4/2012 | Wirtz ............................. | 348/43 |
| 2012/0113235 A1* | 5/2012 | Shintani ........................ | 348/51 |
| 2012/0120208 A1 | 5/2012 | Mao | |
| 2012/0140035 A1 | 6/2012 | Oh et al. | |
| 2012/0169854 A1* | 7/2012 | Seo et al. ...................... | 348/56 |
| 2013/0010089 A1* | 1/2013 | Maeda et al. ................. | 348/53 |
| 2013/0083392 A1* | 4/2013 | Jain ............................... | 359/465 |

OTHER PUBLICATIONS

U.S. Appl. No. 13/401,551, filed Feb. 21, 2012 (50 pages).
U.S. Appl. No. 13/401,547, filed Feb. 21, 2012 (33 pages).
United States Patent and Trademark Office, "Notice of Allowance", issued in connection with U.S. Appl. No. 13/401,551, dated Mar. 1, 2013 (9 pages).
United States Patent and Trademark Office, "Non-Final Office Action", issued in connection with U.S. Appl. No. 13/401,547, dated Jul. 30, 2013 (5 pages).
United States Patent and Trademark Office, "Notice of Allowance", issued in connection with U.S. Appl. No. 13/401,547 on Dec. 13, 2013 (9 pages).
United States Patent and Trademark Office, "Corrected Notice of Allowance", issued in connection with U.S. Appl. No. 13/401,547 on Mar. 6, 2014 (4 pages).

\* cited by examiner

METHODS AND APPARATUS TO IDENTIFY EXPOSURE TO 3D MEDIA PRESENTATIONS

RELATED APPLICATION

This patent claims priority from U.S. Provisional Application Ser. No. 61/550,138 which is entitled "METHODS AND APPARATUS TO IDENTIFY EXPOSURE TO 3D MEDIA PRESENTATIONS" and was filed on Oct. 21, 2011. U.S. Provisional Application Ser. No. 61/550,138 is hereby incorporated by reference in its entirety.

FIELD OF THE DISCLOSURE

This disclosure relates generally to audience measurement, and, more particularly, to methods and apparatus to identify exposure to 3D media presentations.

BACKGROUND

Determining size and demographics of an audience to media (e.g., television, radio, movies, websites, Internet Protocol Television (IPTV), Video on Demand (VOD) media, advertisements, etc.) helps media providers (e.g., content creators, broadcasters, advertisers, etc.) to understand their audience and better tailor their offerings. Further, accurate media exposure demographics allow advertisers to target advertisements and/or media content to audiences of a desired size and/or audiences comprising members having a set of desired demographic characteristics (e.g., income level, lifestyles, interests, etc.)

DETAILED DESCRIPTION

Market adoption of three dimensional (3D) television (3DTV) is steadily increasing for home use. Because of the display technology used with 3DTV, viewers are sometimes required to wear "3D glasses" that permit the viewer to see the images presented by the television in three dimensions. The 3D glasses are not used with other forms of media consumption, and thus, 3D glasses used by the 3DTV typically remain with the 3DTV and the viewers associated with the 3DTV. Further, each audience member of such a 3DTV will wear a particular set of 3D glasses.

To collect demographics of audiences, an audience measurement entity may enlist a number of media utilizing households and/or consumers (e.g., panelists) to cooperate in an audience measurement study for a (closed or open-ended) period of time. The media usage habits of these panelists, as well as demographic data about these panelists, are collected using automated and/or manual collection methods. The collected data is subsequently used to generate statistics related to media exposure, including, for example, audience sizes, audience demographics, audience preferences, the total number of hours of media exposure per audience member and/or per region, program ratings, audience exposure, etc. Panelists may or may not be provided rewards to encourage participation in the panel; depending on the nature of the study.

Figure 1:
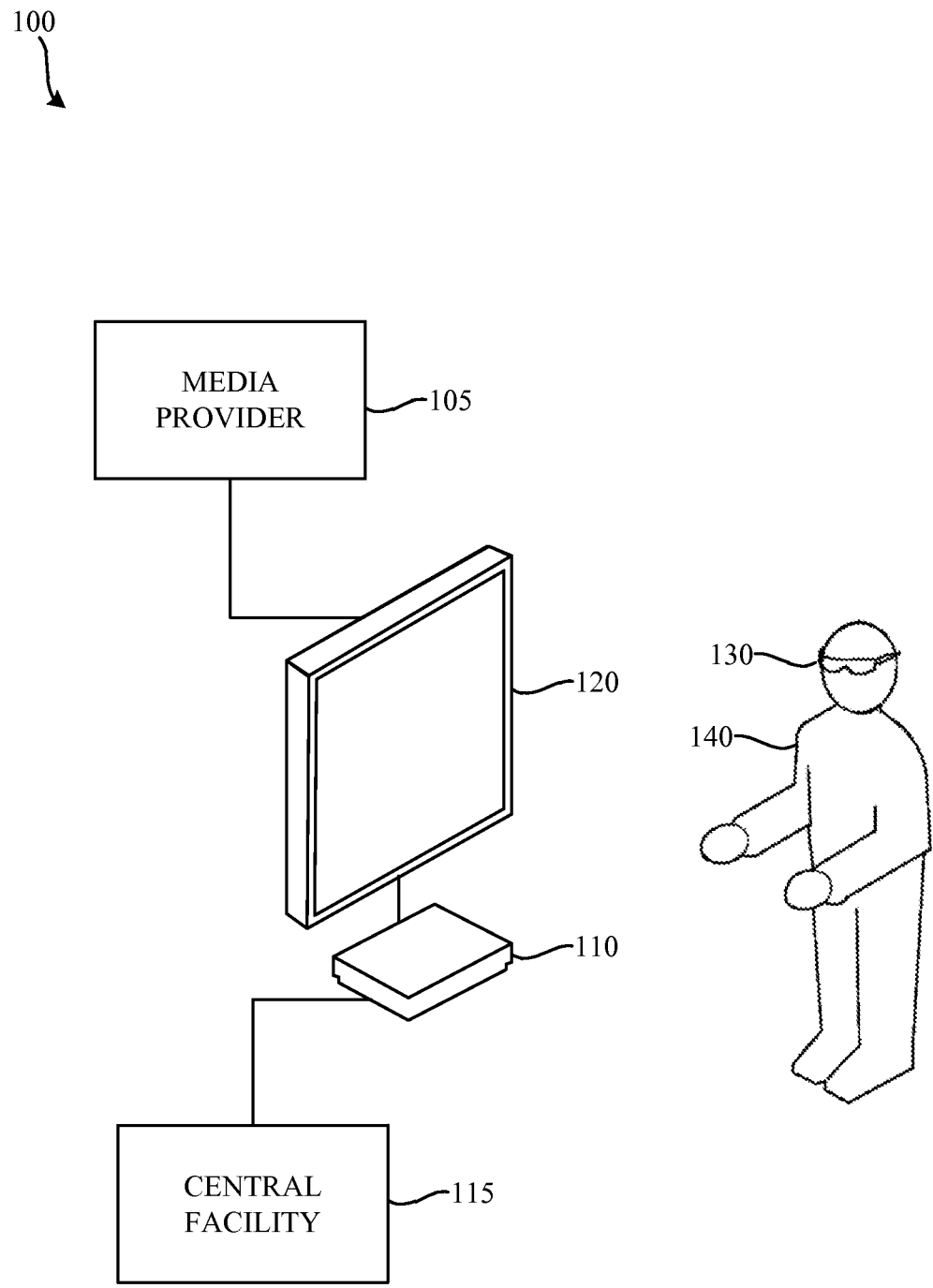
FIG. 1 is a diagram of an example system for identifying exposure to 3D media presentations.

FIG. 1 is a diagram of an example system 100 for identifying exposure to 3D media presentations. The example home audience measurement system 100 of FIG. 1 is adapted to monitor media provided by a media provider 105 for display via a media presentation device 120 to a panelist 140. The example system 100 includes an audience measurement meter 110, a pair of 3D monitoring glasses 130, and a central facility 115 of an audience measurement entity. The example audience measurement meter 110 (e.g., a home unit) aggregates monitoring data for transmission back to a central monitoring facility 115 of an audience measurement entity. In some examples, the meter 110 is a software meter which executes on consumer electronics such as a set-top-box to collect data of interest. In the illustrated example, the meter 110 is associated with the media presentation device 120. In the illustrated example, the media presentation device 120 is a 3D television. However, any other type of media presentation device 120 may additionally or alternatively be used.

The example media provider 105 of FIG. 1 is a broadcast media provider (e.g., a satellite television provider, a cable television provider, an Internet Protocol Television (IPTV) provider, etc.). In the illustrated example, the media provider 105 provides media (e.g., content, advertisements, etc.) such that it can be displayed via a 3D presentation device (e.g., a 3D television). However, in some examples, the media provider may not transmit the media via broadcast. For example, the media may be transmitted to the 3D presentation device by streaming (e.g., pointcast, Internet streaming, local network streaming, etc.), by physical media (e.g., DVD, Blu-Ray, etc.), or by any other method of transferring media (e.g., via an optical disk, via an adapter, etc.).

The meter 110 of the illustrated example transmits aggregated monitoring data to the central facility 115 (e.g., via an Internet connection). In some examples, the meter 110 is shipped to the central facility 115 for data extraction and analysis. In the illustrated example, the meter 110 is a standalone device dedicated to collecting audience measurement data. However, the metering device 145 may be integrated into a device having an additional function (e.g., into a set-top-box to tune cable or satellite programming, into a gaming console, etc.)

Disclosed example methods of monitoring media exposure of a panelist 140 includes associating each panelist with a unique pair of 3D monitoring glasses 130. In the example of FIG. 1 involving 3D media presentation (e.g., 3DTV), the monitoring device(s) are the 3DTV monitoring glasses 130. The meter 110 is used to extract and/or analyze codes and/or signatures from data and/or signals collected by and/or input to the meter 110 in another manner (e.g., by analyzing free field audio output by the monitored presentation device 120 and detected by the monitor 110 with a microphone exposed to ambient sound).

Identification codes, such as watermarks, ancillary codes, etc. may be embedded within and/or otherwise transmitted with media signals. Identification codes are data that are inserted into media (e.g., audio) to uniquely identify broadcasters and/or media (e.g., content or advertisements), and/or are carried with the media for another purpose such as tuning (e.g., packet identifier headers ("PIDs") used for digital broadcasting). Codes are typically extracted using a decoding operation.

Signatures are a representation of some characteristic of the media signal (e.g., a characteristic of the frequency spectrum of the signal). Signatures can be thought of as fingerprints. They are typically not dependent upon insertion of identification codes in the media, but instead preferably reflect an inherent characteristic of the media and/or the media signal. Systems to utilize codes and/or signatures for audience measurement are long known. See, for example, Thomas, U.S. Pat. No. 5,481,294, which is hereby incorporated by reference in its entirety.

The example central facility 115 of the illustrated example of FIG. 1 includes an interface to receive monitoring information from the meter 110 via a network such as, for example, the Internet. Alternatively, any other method(s) to receive metering information may be used. In the illustrated example, the central facility 115 stores and analyzes media monitoring information received from a plurality of meters. For example, the central facility 115 may collect media monitoring information and associate the presentation of such media with demographic information. In this manner, the example central facility 115 generates detailed exposure measures based on collected media monitoring information and associates such exposure measures with respective user demographics.

An example problem faced by media monitoring entities hosting panels is panelist compliance. A panelist 140 may forget to correctly use the monitoring device 130 and/or may find usage of the monitoring device 130 cumbersome and, thus, may avoid using the same. However, because usage of 3D glasses is required for viewing the 3D television 120 of the example of FIG. 1, when metering functionality is embedded in 3D monitoring glasses 130, compliance is much more likely. Further, each pair of 3D monitoring glasses 130 may be associated with a particular panelist 140. As a result, data collected by the 3D monitoring glasses 130 can be associated with the particular panelist 140. Consequently, monitoring data across a household of panelists can be accurately collected.

Figure 2A:
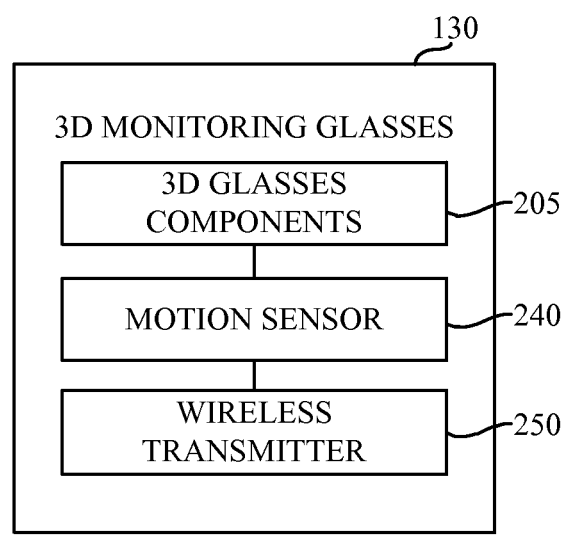
FIGS. 2A and 2B are block diagrams of example 3D monitoring glasses that may be used in the example system of FIG. 1.
Figure 2B:
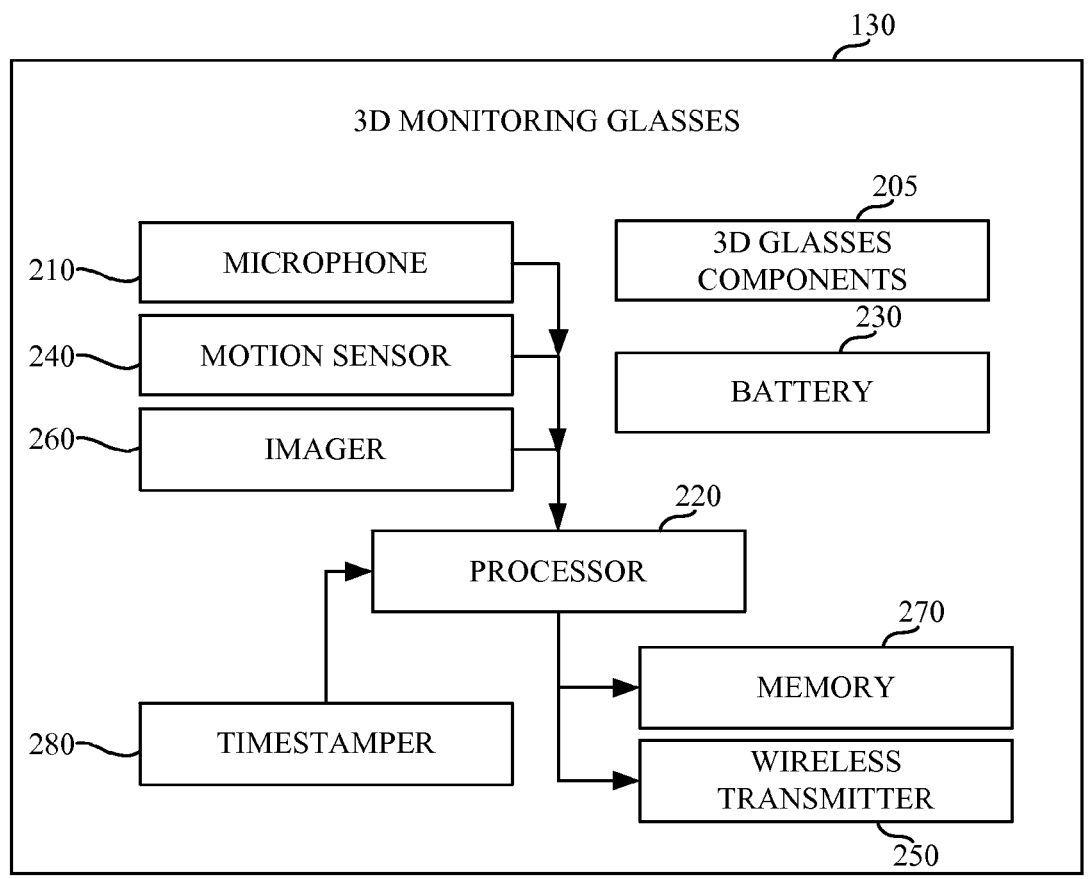

FIGS. 2A and 2B are block diagrams of example implementations of 3D monitoring glasses 130 that may be used in the example system of FIG. 1. The 3D monitoring glasses 130 include 3D glasses components 205 that allow the panelist 140 to view 3D media presentations (e.g., via lenses (e.g., a passive 3D system) and/or shuttering systems (e.g., an active 3D system)). In addition to 3D glasses components 205, the 3D monitoring glasses 130 of FIG. 2A include a motion sensor 240 and a wireless transmitter 250. The 3D monitoring glasses 130 of FIG. 2B include the 3D glasses components 205, a microphone 210, a processor 220, a battery 230, the motion sensor 240, a wireless transmitter 250, an imager 260, a memory 270, and a timestamper 280. The 3D monitoring glasses 130 are in communication with the meter 110 (e.g., wirelessly and/or through a docking and/or charging station). The meter 110 collects and/or generates audience measurement data for transportation and/or transmission to the central monitoring facility.

In the illustrated examples, the 3D monitoring glasses 130 are associated with a panelist 140 for a period of time (e.g., a single media session, multiple media sessions, etc.). As such, the 3D monitoring glasses 130 may include indicia that enable the panelist 140 to identify which pair of monitoring glasses 130 they should use. For example, the indicia may be a color coding (e.g., a first panelist is associated with a blue pair of 3D monitoring glasses, a second panelist is associated with a red pair of 3D monitoring glasses, etc.), an alphanumeric identifier (e.g., a first panelist is associated with a pair of 3D monitoring glasses labeled as "1", a second panelist is associated with a pair of 3D monitoring glasses labeled as "2", etc.), a name of the panelist, etc. In some examples, multiple indicia may be used to enable the panelist to recognize which pair of monitoring glasses to use. For example, the 3D monitoring glasses associated with a first panelist may be of a particular color, display an alphanumeric identifier, and display the name of the panelist.

In the illustrated example, the 3D monitoring glasses 130 include 3D glasses components 205. Three dimensional sight is achieved when each eye of a viewer receives a different image representing a different perspective of view. The two images are interpreted by the brain of the viewer to simulate a depth of field. To provide two different images, one to each eye of the viewer, the presentation device 120 (e.g., a 3D television) displays two separate images while the viewer wears a 3D viewing device (e.g., the 3D monitoring glasses 130) that restricts passage of each image to a respective eye.

In the illustrated example, the 3D monitoring glasses 130 are for use with the presentation device 120. Based on the display technology of the presentation device 120, the 3D glasses components 205 may vary. In the illustrated example, the presentation device 120 is an active 3D television. Active 3D television successively displays each image (e.g., a first image is displayed at a first time, and a second image is displayed at a second time). The active 3DTV sends a control signal to the 3D glasses components 205 of the 3D monitoring glasses 130. In some examples, the control signal is an infrared control signal, a wireless control signal, a Bluetooth control signal, etc. The control signal causes a first lens of the 3D glasses components 205 to block transmission of the first image and a second lens of the 3D glasses components 205 to block transmission of the second image by actively shuttering the first and second lenses. Thus, in the illustrated example, the 3D glasses components 205 include a plurality of shuttered lenses and a control signal receiver.

In some examples, the presentation device 120 is a passive 3D television. Passive 3D television displays each image with alternating perpendicular polarizations. The first image is displayed with a first polarization (e.g., a horizontal polarization) and the second image is displayed with a second polarization that is perpendicular to the first polarization (e.g., a vertical polarization). The 3D glasses components 205 of the 3D monitoring glasses 130 used with passive 3D television systems include a first lens oriented in the first polarization and a second lens oriented in the second polarization. Thus, the first image is displayed through the first lens while the second image is displayed through the second lens.

The microphone 210 of the illustrated example captures audio from the surroundings of the 3D monitoring glasses 130. When in proximity of the media presentation device 120 and when the media presentation device 120 is presenting media, the microphone 210 is likely to receive audio produced by the media presentation device 120. In the illustrated example, the microphone 210 is a front facing directional microphone that is best suited for picking up audio from the direction the 3D monitoring glasses 130 are facing. Thus, when the panelist 140 is wearing the 3D monitoring glasses 130, the front facing directional microphone primarily receives audio from the direction that the panelist 140 is looking. In some examples, the microphone 210 may be omnidirectional and may receive audio from all of the surroundings of the 3D monitoring glasses 130. The audio (or codes and/or signatures extracted from the audio and identifying the media) received by the microphone 210 is transmitted to the processor 220.

The processor 220 of the illustrated example of FIG. 2B is implemented by a processor executing instructions, but it could alternatively be implemented by an application specific integrated circuit(s) (ASIC(s)), programmable logic device (s) (PLD(s)) and/or field programmable logic device(s) (FPLD(s)), or other circuitry. The processor 220 of the illustrated example receives audio from the microphone 210 and video and/or images from the imager(s) 260. The processor 220 then forwards the audio, the video, the images, and/or identification information (e.g., codes, signatures, metadata, etc.) extracted from the audio, video, and/or images to the wireless transmitter 250 for transmission to the meter 110. In some examples, the processor 220 compresses the audio, the video, and/or the images before the wireless transmitter 250 transmits the audio, the video, and/or the images to the meter 110. However, in some examples, the processor 220 identifies metadata, codes, and/or signatures carried in the audio, the video, and/or the images, and then transmits the identified metadata, codes, and/or signatures to the meter 110 in place of, or in addition to, the audio. In some examples, the processor 220 transmits a timestamp of the time to the meter 110 to enable accurate identification and/or correlation of the media that was presented and/or the time that it was presented.

The battery 230 of the illustrated example is a small rechargeable battery. In the illustrated example, the battery 203 can last for days at a time without requiring a recharge. However, discharge cycles shorter than days may alternatively be used. For example, any period of time longer than a typical viewing session (e.g., 1 hour, two hours, five hours, etc.) might be used. Additionally, the processor 220 may implement power management schemes that prevent the components of the 3D monitoring glasses 130 from consuming power too quickly. The battery of the 3D monitoring glasses 130 may be rechargeable via an external connector or the battery 130 may be replaceable.

The motion sensor 240 of the illustrated example is used to determine when a panelist is wearing the 3D monitoring glasses 130. In the illustrated example, the motion sensor 240 is implemented by an accelerometer. However, any motion detecting device and/or circuitry may additionally and/or alternatively be used. The motion sensor 240 senses motion of the 3D monitoring glasses 130 and reports the motion to the processor 220. The processor 220 of the illustrated example employs this information to determine if the panelist 140 is wearing the 3D monitoring glasses 130. Further, the processor 220 of the illustrated example uses the motion information for power conservation purposes (e.g., only turn on when movement is detected, etc.). Motion monitoring ensures that the panelist 140 is using the monitoring system 100 appropriately. For example, a panelist may leave the 3D monitoring glasses 130 on a table near the media presentation device 120. However, because the motion sensor 240 reports no movement, the panelist 140 is not incorrectly credited with viewing the media.

The wireless transmitter 250 of the 3D monitoring glasses 130 of the illustrated example communicates with the meter 110 to transmit information provided by the processor 220 of the 3D monitoring glasses 130. The wireless transmitter 250 of the illustrated example is implemented by an Institute of Electrical and Electronics Engineers (IEEE) 802.15.4 ZigBee radio. However, any other type of transmitter may additionally or alternatively be used. For example, Bluetooth, WiFi, and/or cellular radios may be used.

In addition to transmitting the audio, video, codes, signatures, metadata, and/or motion sensor data, the wireless transmitter 250 of the illustrated example additionally transmits a unique identifier associated with the 3D monitoring glasses 130. When the unique identifier is associated with a particular panelist of a household (e.g., the same panelist 140 wears the same 3D monitoring glasses 130 from media session to media session or the panelist registers as wearing the particular 3D monitoring glasses 130 at the start of a media session), monitoring data acquired from the 3D monitoring glasses 130 uniquely identifies media displayed to that particular panelist 140.

In some examples, the 3D monitoring glasses 130 include the imager 260. In the illustrated example, the imager 260 is implemented by a front facing camera. The imager 260 captures images and/or video of what the user is viewing and forwards the images to the processor 220. In some examples, multiple imagers 260 are used to record what is being viewed through each of the lenses. Further, in some examples, the imagers(s) 260 are polarized to reduce glare from the media presentation device 120.

In the illustrated example, the 3D monitoring glasses 130 additionally include a memory 270. The memory 270 stores information to be later transmitted by the wireless transmitter 250. In examples in which the wireless transmitter 250 is omitted, the panelist 140 is required to connect the 3D monitoring glasses 130 to the meter 110 to transfer monitoring data from the 3D monitoring glasses 130 to the meter 110 (e.g., via a docking station). Additionally or alternatively, the battery 230 may be recharged when docked to the meter 110 during the monitoring data transmission process.

The timestamper 280 of the illustrated example of FIG. 2B is implemented by a processor executing instructions, but could alternatively be implemented by an ASIC, DSP, FPGA, or other analog and/or digital circuitry. In the illustrated example of FIG. 2B, the timestamper 280 timestamps monitoring data stored in the memory 270 and/or as the monitoring data is transmitted via the wireless transmitter 250. Timestamping (e.g., recording a time that an event occurred) enables accurate identification and/or correlation of media that was presented and/or the time that it was presented with the audience exposed to the media as well as the format (e.g., 3D or 2D) in which it was presented. In some examples, the timestamper 280 is synchronized with the meter 110 via the wireless transmitter 250. Synchronizing the timestamper 280 enables more accurate correlation of metering information from the 3D monitoring glasses 130 with the metering information stored at the meter 110.

Once the meter 110 has received the audio data, the image and/or video data, the motion sensor data, the codes, the signatures, the metadata, and/or the unique identifier, the meter 110 processes the received data and stores the processed monitoring data for transmission to the central monitoring facility. In some examples, the audio, image, and/or video is processed for metadata, codes, and/or signatures that identify or may be used to identify the presented media and/or advertisements. The metadata, the codes, and/or the signatures may be stored in a memory of the meter 110 and/or immediately forwarded (e.g., streamed) to the central monitoring facility 115. Based on the metadata, codes, and/or signatures, the meter 110 and/or central monitoring facility 115 identifies the media (e.g., media and/or advertisements) being presented to the panelist 140. In some examples, the collected and/or presented data is analyzed to generate engagement metrics. Engagement metrics may be used to determine if the user was actively viewing the media presentation device 120. For example, monitoring companies may be interested to know if a panelist did something else (e.g., read a magazine) while commercials are being presented. Such reading may be reflected by data collected by the imager 260. Additionally, the motion sensor data may be used to determine if the panelist removed the 3D monitoring glasses 130 for a period of time (e.g., during commercials).

Figure 3:
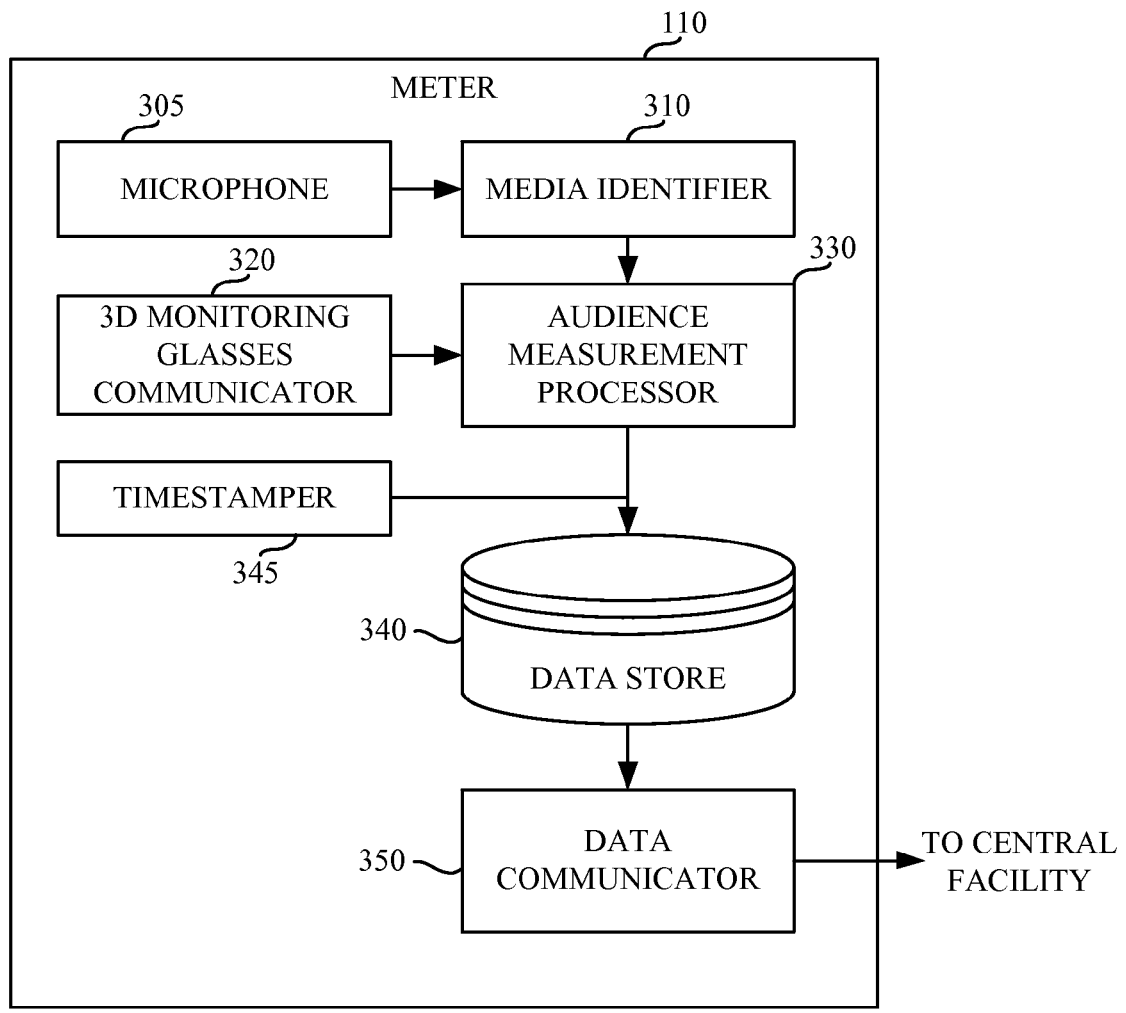
FIG. 3 is a diagram of an example audience measurement meter that may be used in the example system of FIG. 1.

FIG. 3 is a diagram of an example audience measurement meter 110 that may be used in the example system 100 of FIG. 1. The example meter 110 of FIG. 1 includes a microphone 305, a media identifier 310, a 3D monitoring glasses communicator 320, an audience measurement processor 330, a data store 340, a timestamper 345, and a data communicator 350.

The example microphone 305 of the illustrated example of FIG. 3 captures audio from the surroundings of the meter 110. When the media presentation device 120 is presenting media, the microphone 305 receives audio produced by the media presentation device 120. In the illustrated example, the microphone 305 is an omnidirectional microphone. However, in some examples the microphone is a facing directional microphone that is best suited for picking up audio from the direction of the presentation device 120.

The example media identifier 310 of the illustrated example of FIG. 3 is implemented by a processor executing instructions, but it could alternatively be implemented by an application specific integrated circuit(s) (ASIC(s)), programmable logic device(s) (PLD(s)) and/or field programmable logic device(s) (FPLD(s)), or other circuitry. In the example of FIG. 3, the media identifier 310 interacts with the presentation device 120 to identify the media being displayed by the presentation device. Additionally or alternatively, the media identifier 310 can identify the tuned and/or received media from metadata transmitted with the media, from codes that have been embedded in (or otherwise transmitted with) the media (e.g., any audio or video watermark), and/or based on computed and/or derived signatures (e.g., audio signatures, video signatures, etc.). In some examples, the media identifier 310 is located in the example 3D monitoring glasses 130 of FIG. 2A and/or 2B.

The example 3D monitoring glasses communicator 320 of FIG. 3 is an Institute of Electrical and Electronics Engineers (IEEE) 802.15.4 ZigBee radio. In the illustrated example, the 3D monitoring glasses communicator 320 receives data from and/or transmits information to the wireless transmitter 250 of one or more of the 3D monitoring glasses 130. While in the illustrated example, the 3D monitoring glasses communicator 320 is a wireless communication interface, any other type(s) of interface may additionally or alternatively be used. For example, the data communicator 440 might include one or more of a Bluetooth interface, a WiFi interface, a serial interface, a universal serial bus (USB) interface, etc. While in the illustrated example a single 3D monitoring glasses communicator 320 is shown, any number and/or type(s) of 3D monitoring glasses communicators may additionally or alternatively be used.

The audience measurement processor 330 of the illustrated example of FIG. 3 is implemented by a processor executing instructions, but could alternatively be implemented by an ASIC, DSP, FPGA, or other circuitry. The media identifier 310 and the audience measurement processor 330 may be implemented by the same physical processor. In the illustrated example of FIG. 3, the audience measurement processor 330 receives media identifications from the media identifier 310 and information received from one or more 3D monitoring glasses 130. The audience measurement processor then analyzes the information received from the one or more 3D monitoring glasses 130 to determine if each of the one or more 3D monitoring glasses 130 are being used to view the identified media. In some examples, the audience measurement processor 330 determines if the media received at each of the 3D monitoring glasses 130 match the media identified by the media identifier 310.

In the illustrated examples, the audience measurement processor 330 may receive monitoring information from multiple pairs of 3D monitoring glasses 130. When the same monitoring information is received from more than one pair of 3D monitoring glasses, not all of the data need be processed. Instead, as the data will be duplicative, monitoring information from a subset (e.g., one) of the 3D monitoring glasses 130 may be processed.

In the illustrated examples, the audience measurement processor 330 determines an association of the 3D monitoring glasses 130 with a particular panelist 140. In some examples, the panelist 140 may register with the system for each session (e.g., the panelist 140 indicates which pair of 3D monitoring glasses they are using), or may register with the system for multiple sessions (e.g., the panelist 140 indicates that they will use a particular pair of 3D monitoring glasses in the future). The registration information may be stored in a lookup table of the data store 340. The look-up table stores associations of a panelist and a pair of 3D monitoring glasses. Additionally or alternatively, the look-up table may store a time that the panelist was associated with the pair of 3D monitoring glasses (e.g., a start time and an end time of a media presentation session). The audience measurement processor 330 stores the media identification and an indication of whether the 3D monitoring glasses 130 were used to view the identified media in the data store 340.

The data store 340 of the illustrated example of FIG. 3 may be implemented by any device for storing data such as, for example, flash memory, magnetic media, optical media, etc. Furthermore, the data stored in the data store 340 may be in any data format such as, for example, binary data, comma delimited data, tab delimited data, structured query language (SQL) structures, etc. While in the illustrated example the data store 340 is illustrated as a single database, the data store 340 may be implemented by any number and/or type(s) of databases.

The timestamper 345 of the illustrated example of FIG. 3 is implemented by a processor executing instructions, but could alternatively be implemented by an ASIC, DSP, FPGA, or other analog and/or digital circuitry. The media identifier 310, the audience measurement processor 330, and/or the timestamper 345 may be implemented by the same physical processor. In the illustrated example of FIG. 3, the timestamper 345 timestamps media identifications stored in the data store 340 by the audience measurement processor 330. Timestamping (e.g., recording a time that an event occurred) enables accurate identification and/or correlation of media that was presented and/or the time that it was presented with persons exposed to such media as indicated by the timestamped data collected via the 3D monitoring glasses. In some examples, the timestamper 345 of the meter 110 is synchronized with the timestamper 280 of the 3D monitoring glasses 130. Synchronization of the timestamps is implemented by transmitting a time from the timestamper 345 of the meter 110 to the timestamper 280 of the 3D monitoring glasses via the 3D monitoring glasses communicator 320 of the meter 110 and the wireless transmitter 250 of the 3D monitoring glasses 130. The timestamper 280 of the 3D monitoring glasses 130 then resets a clock (e.g., a clock that is used to timestamp information) to the received time.

The data communicator 350 of the illustrated example of FIG. 3 is implemented by an Ethernet interface. In the illustrated example, the data communicator 350 transmits data stored in the data store 340 to the central facility 115 via, for example, the Internet. While in the illustrated example, the data communicator 350 is an Ethernet interface, any other type(s) of interface may additionally or alternatively be used. For example, the data communicator 350 might include one or more of a Bluetooth interface, a WiFi interface, a digital subscriber line (DSL) interface, a T1 interface, etc. While in the illustrated example a single data communicator 350 is shown, any number and/or type(s) of data communicators may additionally or alternatively be used.

While an example manner of implementing the 3D monitoring glasses 130 and/or the meter 110 have been illustrated in FIGS. 1, 2A, 2B, and/or 3, one or more of the elements, processes and/or devices illustrated in FIGS. 1, 2A, 2B, and/or 3 may be combined, divided, re-arranged, omitted, eliminated and/or implemented in any other way. Further, the example microphone 210, the example processor 220, the example battery 230, the example motion sensor 240, the example wireless transmitter 250, the example imager 260, the example memory 270, the example timestamper 280, and/or more generally, the 3D monitoring glasses 130 of FIGS. 1, 2A, and/or 2B, and/or the example microphone 305, the example media identifier 310, the example 3D monitoring glasses communicator 320, the example audience measurement processor 330, the example data store 340, the example timestamper 345, the example data communicator 350, and/or more generally, the meter 110 of FIGS. 1 and/or 3 may be implemented by hardware, software, firmware and/or any combination of hardware, software and/or firmware. Thus, for example, any of the example microphone 210, the example processor 220, the example battery 230, the example motion sensor 240, the example wireless transmitter 250, the example imager 260, the example memory 270, the example timestamper 280, and/or more generally, the 3D monitoring glasses 130 of FIGS. 1, 2A, and/or 2B, and/or the example microphone 305, the example media identifier 310, the example 3D monitoring glasses communicator 320, the example audience measurement processor 330, the example data store 340, the example timestamper 345, the example data communicator 350, and/or more generally, the meter 110 of FIGS. 1 and/or 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example microphone 210, the example processor 220, the example battery 230, the example motion sensor 240, the example wireless transmitter 250, the example imager 260, the example memory 270, the example timestamper 280, the example microphone 305, the example media identifier 310, the example 3D monitoring glasses communicator 320, the example audience measurement processor 330, the example data store 340, the example timestamper 345, and/or the example data communicator 350 are hereby expressly defined to include a tangible computer readable medium such as a memory, DVD, CD, Blu-ray, etc. storing the software and/or firmware. Further still, the example 3D monitoring glasses 130 of FIGS. 1 and/or 2, and/or the example meter 110 of FIGS. 1 and/or 3 may include one or more elements, processes and/or devices in addition to, or instead of, those illustrated in FIGS. 1, 2A, 2B, and/or 3, and/or may include more than one of any or all of the illustrated elements, processes and devices.

It is noted that the system 100 of FIG. 1 may additionally be provided with a people meter to identify individuals in the monitored audience (e.g., when the 3D monitoring glasses are not being used). The people meter enables the system 100 to identify individuals in the audience regardless of whether they are using the 3D monitoring glasses 130. Identifying the individuals in the audience allows mapping of their demographics to the media. Panelists provide their demographic information when they agree to be monitored by the audience measurement system. Any method of people metering may be employed. For example, the people metering may be active in that it requires panelists to periodically self-identify by, for instance, entering an identifier corresponding to their name(s), or it may be passive in that electronics (e.g., video cameras) may be used to identify and/or count persons in the audience. See U.S. Pat. No. 7,609,853, which is hereby incorporated by reference herein in its entirety for an example people metering solution.

Figure 4:
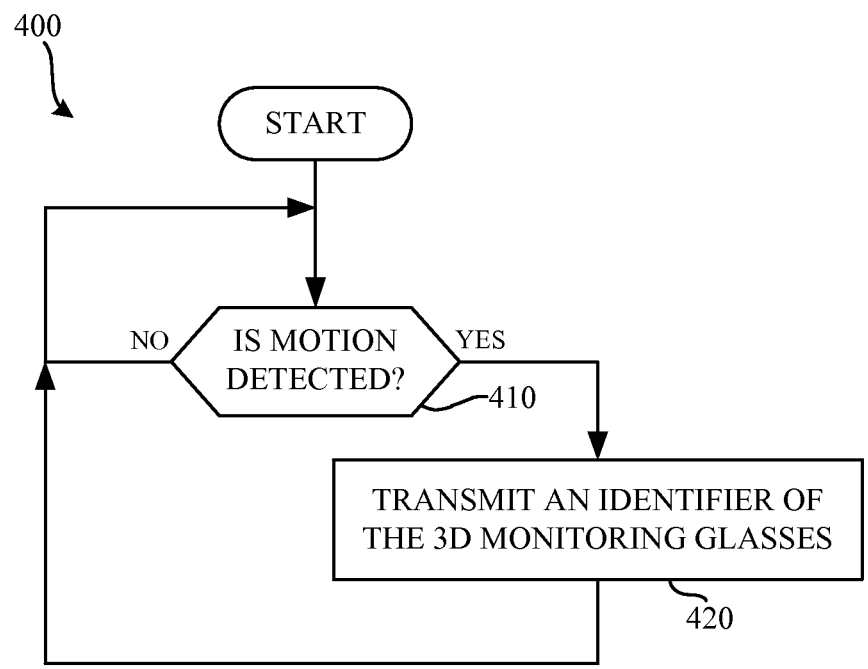
FIG. 4 is a flowchart representative of example machine-readable instructions which may be executed to implement the example 3D monitoring glasses of FIGS. 1, 2A and/or 2B.
Figure 6:
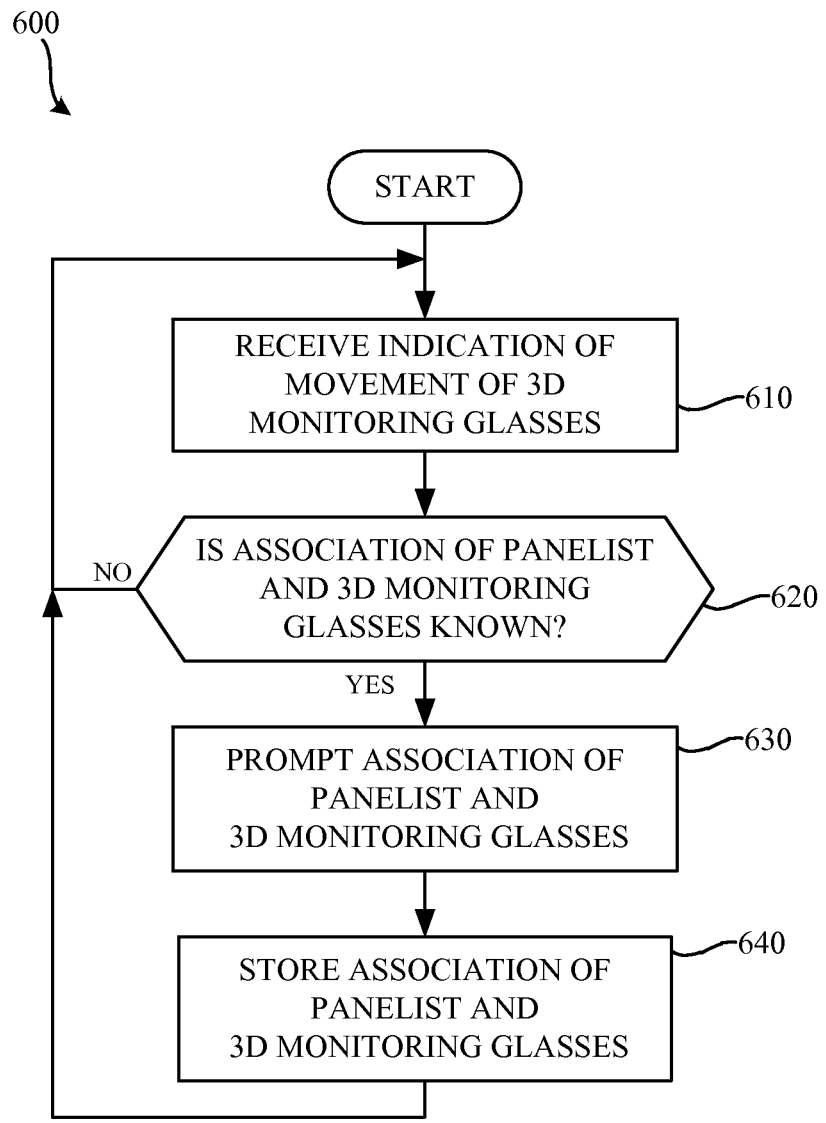
FIG. 6 is a flowchart representative of example machine-readable instructions which may be executed to implement the example audience measurement meter of FIGS. 1 and/or 3 to associate a particular panelist with a particular pair of 3D monitoring glasses.
Figure 7:
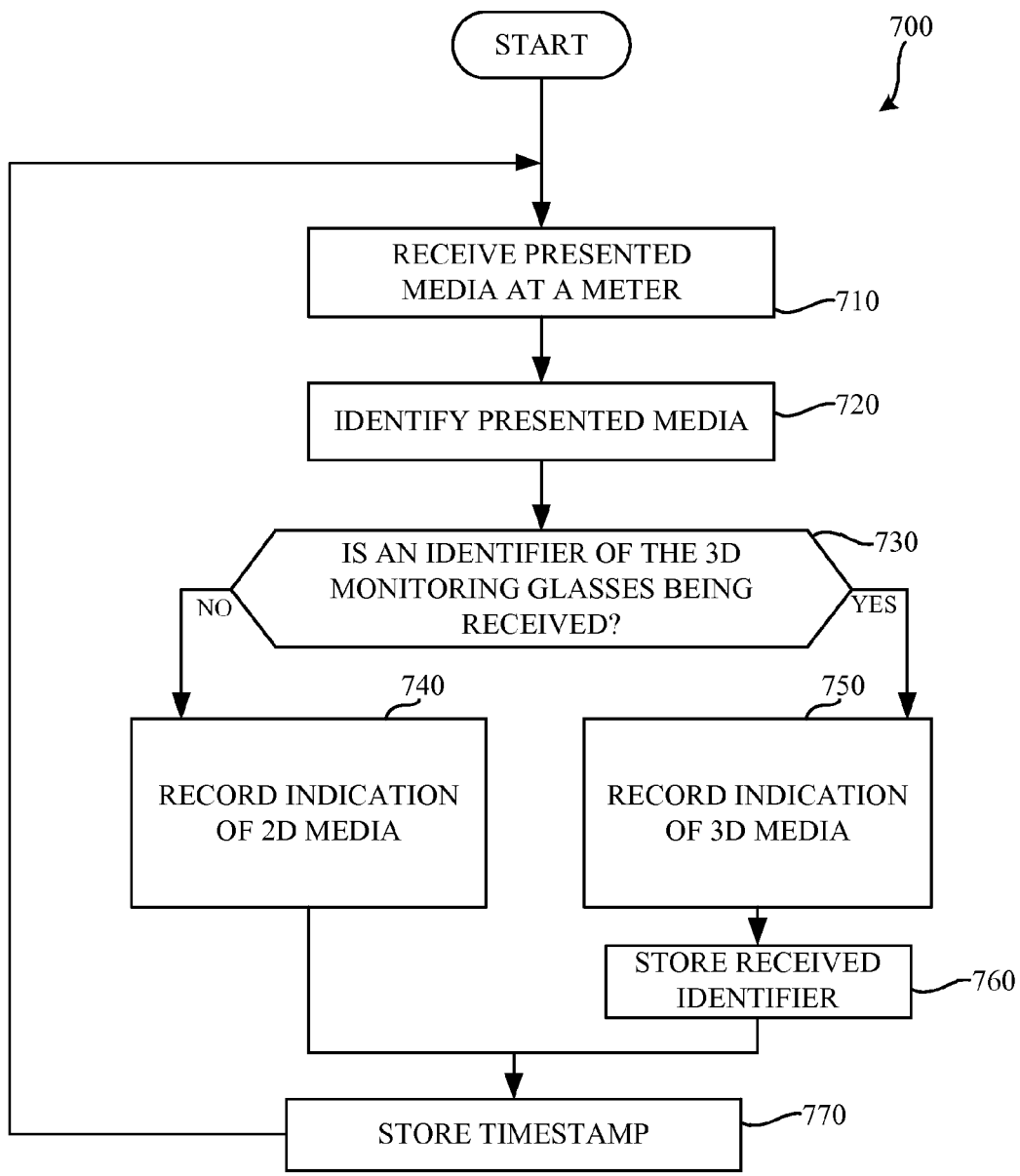
FIG. 7 is a flowchart representative of example machine-readable instructions which may be executed to implement the example audience measurement meter of FIGS. 1 and/or 3 to identify exposure to 3D media presentations.
Figure 8:
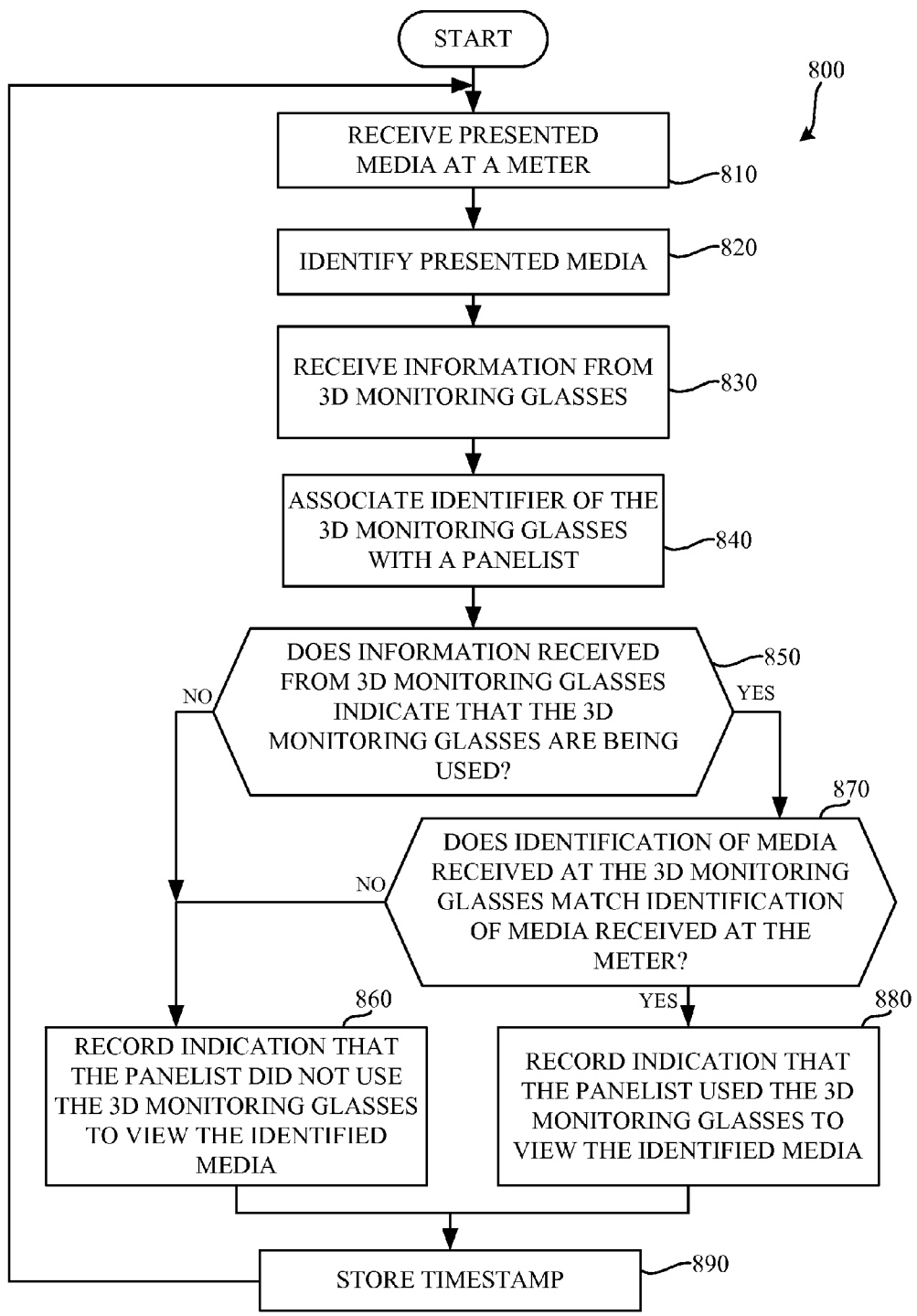
FIG. 8 is a flowchart representative of example machine-readable instructions which may be executed to implement the example audience measurement meter of FIGS. 1 and/or 3 to identify exposure to 3D media presentations.

Flowcharts representative of example machine-readable instructions for implementing the example 3D monitoring glasses 130 of FIGS. 1, 2A, and/or 2B are shown in FIGS. 4 and/or 5. Flowcharts representative of example machine-readable instructions for implementing the example meter 110 of FIGS. 1 and/or 3 are shown in FIGS. 6, 7, 8, and/or 9. In these examples, the machine-readable instructions comprise a program(s) for execution by a processor such as the processor 1012 shown in the example processor platform 1000 discussed below in connection with FIG. 10. The program(s) may be embodied in software stored on a tangible computer-readable medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIG. 4, 5, 6, 7, 8, and/or 9, many other methods of implementing the example 3D monitoring glasses 130 of FIGS. 1, 2A, and/or 2B, and/or the example meter 110 of FIGS. 1 and/or 3 may alternatively be used. For example, the order of execution of the blocks may be changed, and/or some of the blocks described may be changed, eliminated, or combined.

As mentioned above, the example processes of FIGS. 4, 5, 6, 7, 8, and/or 9 may be implemented using coded instructions (e.g., computer-readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example processes of FIGS. 4, 5, and/or 6 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 4 is a flowchart 400 representative of example machine-readable instructions which may be executed to implement the example 3D monitoring glasses 130 of FIGS. 1 and/or 2A. The program of FIG. 4 begins at block 410 when the motion sensor 240 generates a movement signal based on movement of the 3D monitoring glasses 130. Movement may be detected if, for example, the 3D monitoring glasses 130 are being used by a panelist. Conversely, not detecting motion for more than a threshold period of time indicates that the 3D monitoring glasses 130 are not being used by the panelist. If motion is not detected for more than the threshold period of time (block 410), no identifier is transmitted and the motion sensor continues to attempt to detect motion. If motion is detected (block 410), the wireless transmitter 250 transmits an identifier of the 3D monitoring glasses 130 (block 420). Because each pair of 3D monitoring glasses 130 is uniquely associated with a panelist 140, identifying which pair of 3D monitoring glasses 130 is being used to view the presented media allows for identification of which panelist 140 viewed the presented media. Because the example 3D glasses 130 of FIG. 2A only transmit this identifier when they are being used, and because 3D glasses are only used to view 3D media, the meter 110 can log the media it identifies as 3D content whenever it receives an identifier from a pair of 3D glasses. Thus, transmitting the 3D glasses identification serves the dual purpose of identifying the panelist and notifying the meter 110 that the media is presented in a 3D format. The meter 110 can, thus, perform all media identifications with the example of FIG. 2A, but be adapted to decode identifiers for 3D glasses and, interpret such identifiers as inherent indications that 3D media is currently being presented.

Figure 5:
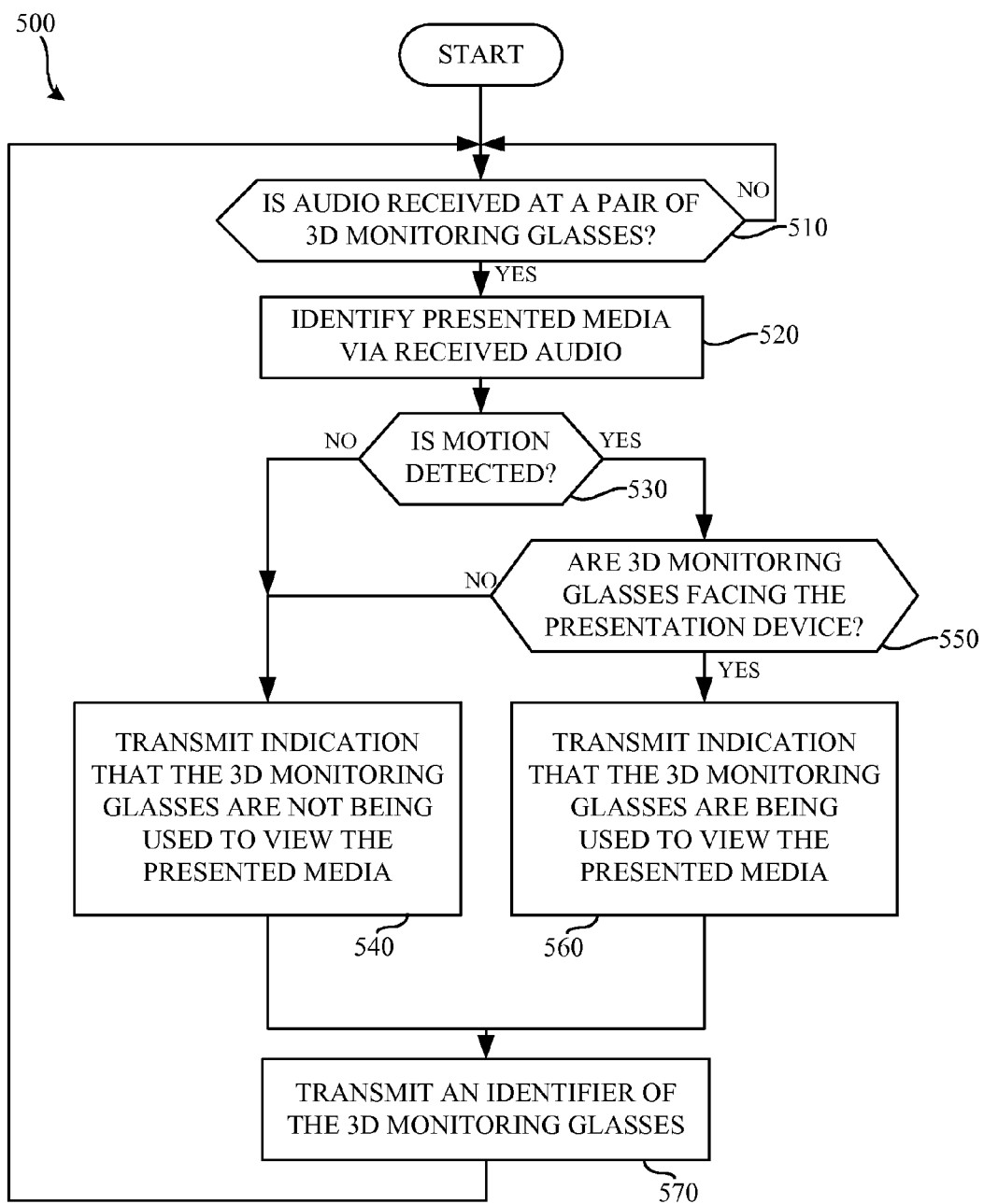
FIG. 5 is a flowchart representative of example machine-readable instructions which may be executed to implement the example 3D monitoring glasses of FIGS. 1, 2A and/or 2B.

FIG. 5 is a flowchart 500 representative of example machine-readable instructions which may be executed to implement the example 3D monitoring glasses 130 of FIGS. 1, 2A, and/or 2B. The program of FIG. 5 begins at block 510 when the processor 220 determines if audio is being received via the microphone 210 (block 510). If no audio is being received, then no media is being presented and control proceeds to wait until audio is received. Once the processor 220 detects that audio is received via the microphone 210, the processor 220 identifies the media being presented in association with the audio by, for example, detecting and/or deriving a watermark (e.g., a code) and/or signature of and/or within the received audio (block 520). In some examples, the media is identified by the meter 110 and blocks 510 and 520 are omitted. Once the media is identified, the motion sensor 240 determines if motion (e.g., movement) is detected (block 530). Movement may not be detected if, for example, the 3D monitoring glasses 130 are not worn by a user. Thus, not detecting motion indicates that the 3D monitoring glasses 130 are not being used to view the presented media. If movement is not detected, control proceeds to block 540 where the wireless transmitter 250 transmits an indication that the 3D monitoring glasses 130 are not being used to view the presented media (block 540).

In some examples, detecting motion of the 3D monitoring glasses may provide a false reading that the 3D monitoring glasses 130 are being used to view the presented media. For example, if the 3D monitoring glasses 130 are carried in a pocket of a panelist, worn by the panelist on the top of their head, worn by the panelist while the panelist is looking away from the presentation device 120, etc., movement may be detected while the 3D monitoring glasses 130 are not used to view the presented media. To reduce the number of false positives, the processor 220 determines if the 3D monitoring glasses 130 are facing the presentation device 120 by interpreting an image from the imager 260 (block 550). The processor 220 may detect, for example, a pattern indicative of a presentation device 120 (e.g., a rectangular or trapezoidal pattern, etc.). If the 3D monitoring glasses 130 are not facing the presentation device 120, the wireless transmitter 250 transmits an indication that the 3D monitoring glasses 130 are not being used to view the presented media (block 540). If the 3D monitoring glasses 130 are facing the presentation device 120, the wireless transmitter 250 transmits an indication that the 3D monitoring glasses 130 are being used to view the presented media (block 560).

In the illustrated example, the wireless transmitter 250 transmits an identifier of the 3D monitoring glasses 130 (block 570). Because each pair of 3D monitoring glasses 130 is uniquely associated with a panelist 140, identifying which pair of 3D monitoring glasses 130 is being used to view the presented media allows for identification of which panelist 140 viewed the presented media. While in the illustrated example the wireless transmitter 250 transmits information in real-time (e.g., without the information having first been stored), the information may be stored in the memory 270 of the 3D monitoring glasses 130 prior to transmission. For example, the stored information may be transmitted when the 3D monitoring glasses 130 are docked for charging, upon periodic intervals (e.g., every five minutes, every hour, every day, etc.), aperiodically (e.g., when the memory 270 is full, etc.), or any combination thereof.

FIG. 6 is a flowchart 600 representative of example machine-readable instructions which may be executed to implement the example meter 110 of FIGS. 1 and/or 3 to associate a particular panelist 140 with a particular pair of 3D monitoring glasses 130. The program of FIG. 6 begins at block 610 when the 3D monitoring glasses communicator 320 receives an identifier of a pair of 3D monitoring glasses from the 3D monitoring glasses 130 (block 610). The audience measurement processor 330 then determines if an association of the identifier of the 3D monitoring glasses 130 is included in a look-up table (block 620). In the illustrated example, the look-up table is stored in the data store 340. In the illustrated example, a panelist may be associated with a particular pair of 3D monitoring glasses and this relationship has been recorded (e.g., during a registration process) for an extended period of time (e.g., one week, during a media monitoring study, etc.). When a panelist is associated with 3D monitoring glasses for an extended period of time (e.g., the panelist always uses the same 3D monitoring glasses), the association of the panelist and the 3D monitoring glasses may be known.

If the association is known (e.g., is present in the look-up table), control proceeds to block 610, where the 3D monitoring glasses communicator 320 waits for additional identifiers. In some examples, panelists are not associated with 3D monitoring glasses for extended periods of time (e.g., more than a single media session, etc.). As such, when the audience measurement processor 330 determines that no association is known (e.g., is not present in the look-up table), the audience measurement processor 330 prompts the audience to self-identify themselves and the 3D monitoring glasses they are using. The audience measurement processor 330 receives an association of the panelist and the 3D monitoring glasses via an input (e.g., a pushbutton, a series of pushbuttons, a touchscreen interface, a voice command, a switch, a series of switches, etc.) (block 630). The audience measurement processor 330 then stores the received association of the panelist and the 3D monitoring glasses in the look-up table (block 640), thereby associating the panelist with the 3D monitoring glasses. In some examples, the panelist is associated with the 3D monitoring glasses for a single media session (e.g., until the movement signal is not detected for a period of time (e.g., five minutes, etc.). In some examples, the panelist is associated with the 3D monitoring glasses for longer than a single media session (e.g., for the duration of a study, for a week, etc.).

In an example where a panelist fails to register, but continues to use the 3D monitoring glasses to view the presented media, the meter 110 may not be able to uniquely identify the panelist. However, the meter 110 may use the monitoring information received from the 3D monitoring glasses 130 to determine other media presentation metrics such as, for example, a presentation format of the media (e.g., 2D, 3D), an identifier of the media that was displayed, etc.

In some examples, the system 100 of FIG. 1 may be provided with a people meter to identify individuals in the monitored audience. The people meter may be used in situations where an audience member fails to register (e.g., the audience member does not self-identify themselves or the 3D monitoring glasses they are using). In such a situation, the audience measurement processor 330 may receive an indication of a panelist and 3D monitoring glasses association to be stored in the look-up table. Additionally or alternatively, because the 3D monitoring glasses are only used when viewing 3D media, when the panelist is viewing 2D media they are not identified by the 3D monitoring glasses. In such examples, the people meter may identify members of an audience using any known methods (e.g., active people metering and/or passive people metering).

FIG. 7 is a flowchart 700 representative of example machine-readable instructions which may be executed to implement the example audience measurement meter 110 of FIGS. 1 and/or 3 to identify exposure to 3D media presentations. The program of FIG. 7 begins at block 710 when the media identifier 310 of the meter 110 receives presented media from the presentation device 120 (block 710). The media identifier 310 then identifies the presented media by for example, deriving and/or identifying a watermark, signature, code, etc. (block 720).

The 3D monitoring glasses communicator 320 then determines if an identifier of the 3D monitoring glasses is being received (block 730). If the identifier of the 3D monitoring glasses is not being received, the audience measurement processor 330 records an indication that the media is being presented in a 2D format (block 740). The timestamper 345 then records a timestamp of the time of the presentation of the media (block 770). While in the illustrated example, the timestamp represents a time that the media was presented, the timestamp may additionally or alternatively represent any other event such as, for example, a time that the media was identified, etc. Control then proceeds to repeat the program of FIG. 7.

Returning to block 730, if an identifier of the 3D monitoring glasses is received, the audience measurement processor 330 records an indication that the media is being presented in a 3D format (block 750). The audience measurement processor 330 then stores the received identifier (block 760), thereby associating the viewing of 3D media with the panelist associated with the 3D glasses. The timestamper 345 then records a timestamp of the time of the presentation of the media (block 770). Control then proceeds to repeat the program of FIG. 7.

FIG. 8 is a flowchart 800 representative of example machine-readable instructions which may be executed to implement the example audience measurement meter 110 of FIGS. 1 and/or 3 to identify exposure to 3D media presentations. The program of FIG. 8 begins at block 810 when the media identifier 310 of the meter 110 receives presented media from the presentation device 120 (block 810). The media identifier 310 then identifies the presented media by for example, deriving and/or identifying a watermark, signature, code, etc. (block 820).

The 3D monitoring glasses communicator 320 then receives the information transmitted by the wireless transmitter 250 of the 3D monitoring glasses 130 (block 830). While in the illustrated example, the information is received in real-time (e.g., as the media is presented and/or shortly thereafter), in some examples, the information may be received after the media has been presented. For example, the information may be received when the 3D monitoring glasses 130 are docked for charging, upon periodic intervals (e.g., every five minutes, every hour, every day, etc.), aperiodically (e.g., when the memory 270 of the 3D monitoring glasses 130 is full, etc.), or any combination thereof Once the information is received, the audience measurement processor 330 determines an association of the 3D monitoring glasses 130 with the panelist 140 (block 840). The audience measurement processor 330 then determines if the information indicates that the panelist 140 used the 3D monitoring glasses 130 (block 850).

If the panelist 140 did not use the 3D monitoring glasses 130 to view the presented media, the audience measurement processor 330 records (e.g., stores) an indication that the panelist 140 did not use the 3D monitoring glasses 130 to view the identified media (block 860). If the panelist 140 used the 3D monitoring glasses 130, the audience measurement processor 330 determines whether an identification of the media received at the 3D monitoring glasses 130 matches an identification of the media received at the meter 110 (block 870). Block 870 may be omitted in examples where either the 3D monitoring glasses 130 or the meter 110, but not both, perform the media identification. If, for example, the panelist 140 was wearing the 3D monitoring glasses 130, but was in another room, then the panelist 140 was not exposed to the media presented by the presentation device 120. In such an example the identification of the media received at the 3D monitoring glasses 130 may not match the identification of the media received at the meter 110. If a match is not present, the audience measurement processor 330 records (e.g., stores) an indication that the panelist 140 did not use the 3D monitoring glasses to view the identified media (block 860). If the identification of the media received at the 3D monitoring glasses 130 matches the identification of the media received at the meter 110, the audience measurement processor 330 records (e.g., stores) an indication that the panelist 140 used the 3D monitoring glasses 130 to view the identified media (block 880). In examples where only the meter 110 identifies the media being presented (e.g., examples where block 870 is omitted), the audience measurement processor 330 records (e.g., stores) the indication that the panelist used the 3D monitoring glasses 130 to view the identified media when the information received from the 3D monitoring glasses indicates that the 3D monitoring glasses are being used.

The timestamper 345 stores a timestamp of the time of the presentation of the media (block 890). While in the illustrated example, the timestamp represents a time that the media was presented, the timestamp may additionally or alternatively represent any other event such as, for example, a time that the media was identified, etc. Control then proceeds to repeat the program of FIG. 8.

Figure 9:
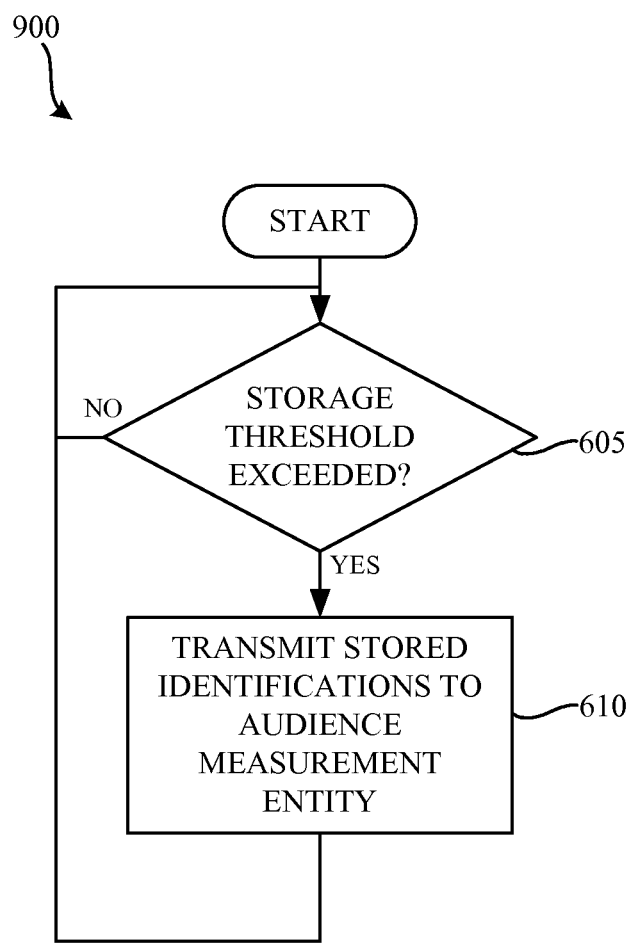
FIG. 9 is a flowchart representative of example machine-readable instructions which may be executed to implement the example audience measurement meter of FIGS. 1 and/or 3 to transmit monitoring information.

FIG. 9 is a flowchart 900 representative of example machine-readable instructions which may be executed to implement the example audience measurement meter 110 of FIGS. 1 and/or 3 to transmit monitoring information to the central facility 115 of an audience measurement entity. The machine-readable instructions 900 of FIG. 9 begin execution at block 905 when the data communicator 350 determines whether a storage threshold has been exceeded (block 905). In the illustrated example, the threshold is a time limit specifying that stored information is transmitted once every day. Additionally or alternatively, any other periodic and/or aperiodic approach to transmitting stored information from the data store 340 may be used. For example, the storage threshold might be based on an amount of information stored in the data store 340.

If the storage threshold has not been exceeded (block 905) the data communicator 350 continues to determine whether the stored information has exceeded the storage threshold. When the storage threshold has been exceeded (block 905), the data communicator 350 transmits the information stored in the data store 340 to the central facility 115. In the illustrated example, the data communicator 350 transmits the stored information via a network such as, for example, the Internet. However, in some examples, the data transmitter 350 transmits the stored data via a local connection such as, for example, a serial connection, a universal serial bus (USB) connection, a Bluetooth connection, etc. When the data transmitter 350 transmits via the local connection, the meter 110 may be physically moved to a location of the central facility 115 by, for example, physically mailing the meter 110, etc.

Figure 10:
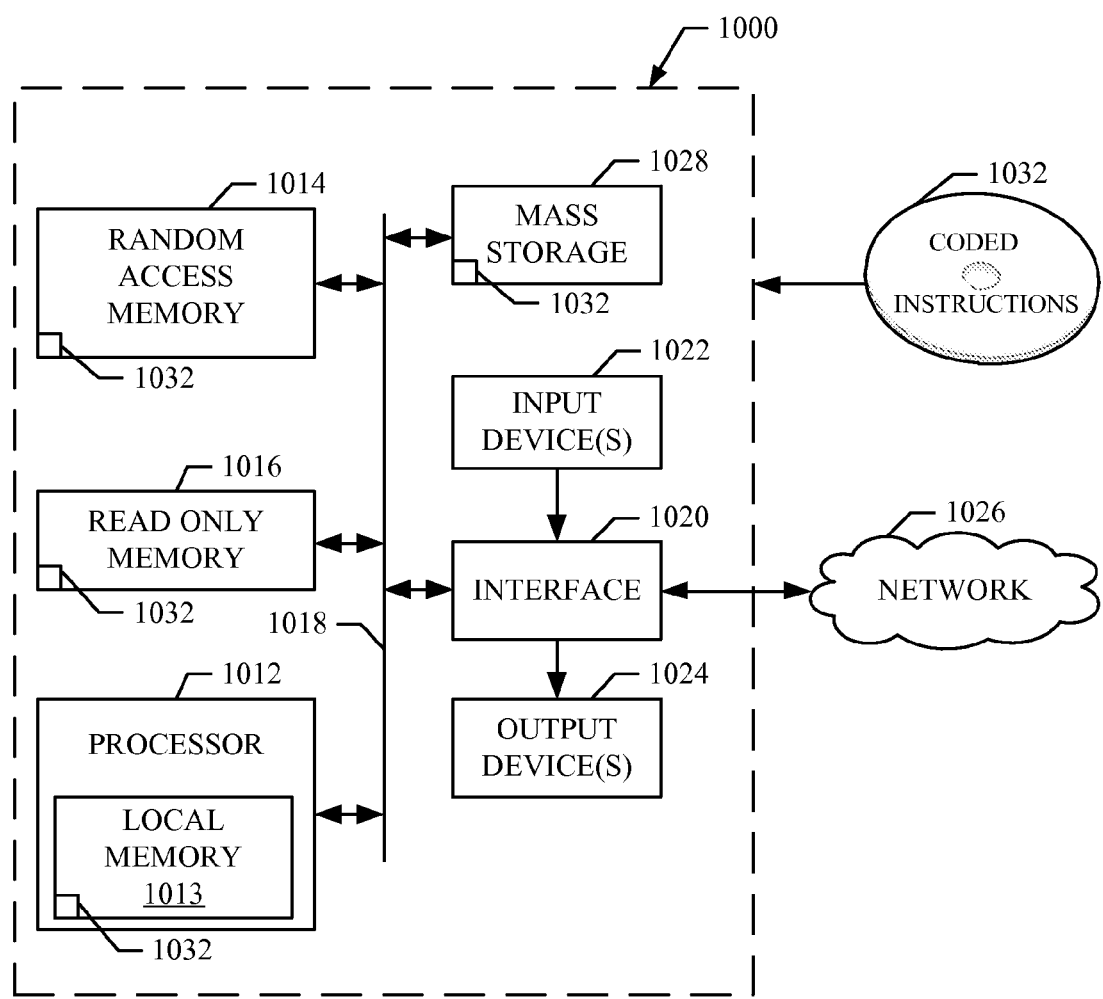
FIG. 10 is a block diagram of an example processor platform capable of executing the example machine-readable instructions of FIGS. 4 and/or 5 to implement the example 3D monitoring glasses of FIGS. 1, 2A and/or 2B, and/or the example machine-readable instructions of FIGS. 6, 7, 8, and/or 9 to implement the example audience measurement meter of FIGS. 1 and/or 3.

FIG. 10 is a block diagram of an example processor platform capable of executing the example machine-readable instructions of FIGS. 4 and/or 5 to implement the example 3D monitoring glasses of FIGS. 1, 2A and/or 2B, and/or the example machine-readable instructions of FIGS. 6, 7, 8, and/or 9 to implement the example audience measurement meter of FIGS. 1 and/or 3.

The example processor platform 1000 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The computer 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device (e.g., the wireless transmitter 250, the 3D monitoring glasses communicator 320, the data communicator 350) such as a modem or network interface card to facilitate exchange of data with external computers via a network (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the memory 270 and/or the data store 340.

The coded instructions 1032 of FIGS. 4, 5, 6, 7, 8 and/or 9 may be stored in the mass storage device 1028, in the volatile memory 1014, in the non-volatile memory 1016, in the local memory 1013, and/or on a removable storage medium such as a CD or DVD.

From the foregoing, it will appreciate that the above disclosed methods, apparatus and articles of manufacture enable accurate determination of media being presented to a panelist and whether that media is being presented in three dimensions. Because the 3D monitoring glasses 130 are used to view 3D television, panelist participation is more likely than with prior art monitoring devices such as personal people meters. Further, the imager(s) 260 mounted on the 3D monitoring glasses 130 enable a monitoring entity to determine if the panelist 140 is actively viewing the media being presented in general and/or at specific times. Moreover, as panelists will only wear the 3D glasses to view 3D media, detecting usage of the glasses is a reliable indication that 3D content is being presented.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus to identify exposure to 3D media presentations, the apparatus comprising:

3D glasses to enable viewing of the 3D media presentation;
a motion sensor carried by the 3D glasses to generate a movement signal;
a processor to determine whether the 3D glasses are being used based on the movement signal, the processor to generate an indication of a format of a media presentation as 2D media or 3D media; and
a transmitter carried by the 3D glasses to transmit an indication of whether the 3D glasses are being used and to transmit the indication of the format of the media presentation.

2. The apparatus as described in claim 1, further comprising a microphone to receive audio associated with the media presentation.

3. The apparatus as described in claim 1, further comprising a memory carried by the 3D glasses to store the indication of whether the 3D glasses components are being used to view the media presentation.

4. The apparatus as described in claim 1, wherein the transmitter is further to transmit an identifier of the 3D glasses.

5. The apparatus as described in claim 1, further comprising an imager to capture an image in a direction in which the 3D glasses are facing, the image to be analyzed to determine whether the 3D glasses are being used to view the media presentation; and the processor is to detect that the 3D glasses are being used to view the media presentation if the image includes a presentation device and the movement signal indicates usage of the 3D glasses.

6. The apparatus as described in claim 1, wherein the 3D glasses include two actively shuttered lenses and a control signal receiver.

7. The apparatus as described in claim 1, wherein the 3D glasses components include two polarized lenses.

8. The apparatus as described in claim 1, wherein the transmitter is a wireless transmitter.

9. The apparatus as described in claim 8, wherein the wireless transmitter is implemented according to the Institute of Electrical and Electronics Engineers 802.15.4 wireless standard.

10. The apparatus as described in claim 1, wherein the processor is to identify the media presentation based on received audio, and the transmitter is to transmit the identification of the media presentation.

11. A method to identify exposure to 3D media presentations, the method comprising:
generating, with a sensor carried in 3D glasses, a motion signal corresponding to movement of the 3D glasses;
collecting, with a processor carried by the 3D glasses, data indicating a 2D presentation format or a 3D presentation format; and
transmitting the motion signal and the data indicating the 2D presentation format or the 3D presentation format from the 3D glasses to a media monitor.

12. The method as described in claim 11, further comprising determining, with a processor of the media monitor, whether the 3D glasses are being used based on the motion signal from the 3D glasses.

13. The method as described in claim 11, wherein transmitting the motion signal occurs periodically.

14. The method as described in claim 11, further comprising identifying the media presentation based on audio received at the 3D glasses.

15. The method as described in claim 11, further comprising:

receiving audio associated with the media presentation at the 3D glasses; and
transmitting the received audio to the media monitor.

16. The method as described in claim 11, further comprising transmitting an identifier of the 3D glasses to the media monitor.

17. The method as described in claim 16, further comprising associating exposure to the media presentation with a panelist based on the identifier.

18. A tangible computer-readable medium comprising instructions which, when executed, cause 3D glasses to at least:
generate a motion signal corresponding to movement of the 3D glasses;
collect data indicating exposure to a 2D presentation format or a 3D presentation format; and
transmit the motion signal and the data indicating exposure to the 2D presentation format or the 3D presentation format to a media monitor.

19. The computer-readable medium as described in claim 18, further comprising instructions which, when executed, cause a processor to determine whether the 3D glasses are being used based on the motion signal.

20. The computer-readable medium as described in claim 18, wherein the instructions cause the 3D glasses to transmit the motion signal periodically.

21. The computer-readable medium as described in claim 19, further comprising instructions which, when executed, cause the processor to at least:
identify the media presentation based on audio received by the 3D glasses.

22. The computer-readable medium as described in claim 18, further comprising instructions which, when executed, cause the 3D glasses to at least:
receive audio associated with the media presentation; and
transmit the received audio.

23. The computer-readable medium as described in claim 18, further comprising instructions which, when executed, cause the 3D glasses to transmit an identifier of the 3D glasses.

24. The computer-readable medium as described in claim 23, further comprising instructions which, when executed, cause the processor to at least:
associate exposure to the media presentation with a panelist based on the identifier; and
associate the data indicating the 2D presentation format or the 3D presentation format with the media presentation.

25. An apparatus to identify exposure to 3D media presentations, the apparatus comprising:
3D glasses to enable viewing of a 3D media presentation;
a motion sensor carried by the 3D glasses to generate a movement signal;
a processor to generate an indication of whether media is presented using a 2D presentation format or a 3D presentation format; and
a transmitter carried by the 3D glasses to transmit the movement signal and the indication of whether the media is presented using the 2D presentation format or the 3D presentation format.

* * * * *